United States Patent Office

3,032,472
Patented May 1, 1962

3,032,472
MICROBIOLOGICAL SECONDARY RECOVERY
Donald O. Hitzman, Bartlesville, Okla., assignor to Phillips Petroleum Company, a corporation of Delaware
No Drawing. Filed June 16, 1960, Ser. No. 36,484
5 Claims. (Cl. 195—3)

This invention relates to a method of secondary recovery of petroleum deposits. In one aspect, this invention relates to employing the spore form of certain microorganisms in a water flood operation to cause increased oil release in situ and increase the amount of recoverable petroleum.

Water flooding is now a well-established secondary recovery technique, involving introduction of water into an oil formation for the purpose of increasing the amount of oil in place that may be recovered. One of the factors which significantly affects the efficiency of such a water flood is oil viscosity. Oils of relatively high viscosity are difficult to flood satisfactorily. It has been found that microorganisms can produce enzymes that convert to lower molecular weight hydrocarbons certain crude oil components; and generate acids and gases, such as carbon dioxide. The over-all effect is a reduction of oil viscosity, and an additional fluid driving force through enlarged pore spaces. This facilitates displacement by the flooding medium and pumping, and thus maximizes oil recovery.

It is customary to utilize the water to be charged to the input wells of a producing pattern as the nutrient medium. The flooding water is usually inoculated with enzyme-producing bacteria, and acid-producing bacteria in combination with a suitable substrate, such as agricultural wastes, from which acids and gases for use in the process can be produced directly in the nutrient medium.

There are a variety of mechanisms by which various types of micro-organisms can aid oil release. Certain bacteria ferment carbohydrates, producing organic acids, enzymes, and generating gases, such as $CO_2$ and $H_2$. The produced gases provide an additional driving fluid in the heart of the formation. Carbonic acid, $H_2CO_3$, resulting from the combination of $H_2O$ with $CO_2$ produced by respiring bacteria, tends to dissolve limestone and other calcerous materials. Organic acids produced also dissolve carbonates. There are other oxidizing bacteria which help to dissolve dolomite or limestone. Sulfate-reducing bacteria attack gypsum, anhydrite and other organic sulfates. The voids and pore spaces which form from the acid dissolution provide for the accumulation and migration of oil.

Other bacteria consume hydrogen to produce enzymes which catalyze the hydrogenation of certain crude oil components to lighter and less viscous products. It is known that detergents or wetting agents are produced by some bacteria growing on a solid surface coated with oil, which help to liberate oil. It has also been observed that certain microorganisms have such marked affinity for solids that they attach themselves to and grow on glass slides coated with grease and oil. The growth of bacteria on solid surfaces literally tends to crowd off oil films.

In the prior methods of operation, once the bacteria came into contact with the nutrient, the metabolic conversion processes began, usually long before the microorganisms were at the place where the action should take place, namely, deep in the pores of the formation. Another difficulty arises in injecting microorganisms in the enlarged vegetative stage, is the mass of cells tend to lodge immediately adjacent to the well bore, so that they and their metabolic products cause plugging. This allows few organisms to penetrate into the formation. Another constant hazard with microorganisms in this active state is that they must also be fed to keep them viable during injection. Moreover, they are very susceptible to environmental changes.

I have found that when the flooding medium is inoculated with microorganisms in the spore form, rather than the vegetative stage, the aforementioned difficulties are mostly resolved. The spores are smaller in size, and thus will penetrate the oil formation easier and farther. Since the spore form is not yet actively metabolizing, it will not produce slimes, or any other matter that will cause plugging of the well bore. As spores are also very resistant to environmental changes, they can be readily handled, and stored for long periods of time without nourishment until they are to be activated by a germinating material.

An object of this invention is to utilize the spore form of microorganisms to achieve a more complete dispersion and deeper penetration of the pores of the formation being water flooded.

Another object is to avoid the problem of maintaining the viability of the vegetative form of the microorganism under field conditions and permit germination at any time the operator wishes.

Still another object is to cause a greater percentage of the oil in formation to be released from the pores of said formation.

Other aspects, objects and advantages of the invention will be apparent to those skilled in the art in view of this disclosure.

Thus, according to this invention, the spore form of a microorganism is used to inoculate the flooding water. The resulting flooding medium is then flooded deep into the formation, being followed by a slug of a germinating material which will cause the spores to germinate in place, changing them to the vegetative state that ferments the carbon sources and forms acids and enzymes, generates gases, such as carbon dioxide, produces wetting agents and perhaps splits the double bond in unsaturates to make more mobile components. Any bacteria which has a spore form can be injected according to this invention.

It is to be noted that a specific strain or strains of microorganisms capable of the spore, or dormant, stage are propagated from an active organism grown on a typical nutrient medium. When the maximum cell production has occurred to the limit of the available nutrient, the culture changes to the spore form, which is isolated by standard techniques, such as centrifugation, followed by washing with mineral medium. There results clean spores, free of vegetative cells and germination materials, which are concentrated and held under refrigeration until needed for inoculation.

One or several of the described mechanisms may be occurring in the formation depending on the type or types of microorganisms injected. It is to be noted that the invention is not limited to any particular species of microorganisms. The only requirement is that the microorganism have a spore stage that can be readily changed to the metabolizing stage in the presence of almost any crude carbohydrate, termed the germinating material. Both aerobic and anaerobic microorganisms are included. Examples of such microorganisms are found in class Schizomycetes, order Eubacteriales, suborder Eubacteriineae, family Bacillaceae, genus Bacillus or Clostridium; or in the family Actinomycetaceae; or in the family Spirillaceae (reclassified herein according to Bergey's Manual of Determinative Bacteriology, 7th edition 1957), genus Desulfovibrio (Sporovibrio).

One may obtain satisfactory results with almost any crude carbohydrate, such as blackstrap molasses, soybean wastes, grain processing wastes, and the like, provided they contain the amino acids which initiate the conversion to vegetative form.

The following example will serve to illustrate the invention.

EXAMPLE I

A pair of runs were made to show a comparison of spore and vegetative forms of microorganisms as a flooding medium component in secondary oil recovery.

A column of sand simulating an oil well core was prepared as follows.

Banding sand obtained from Ottawa Silica Co. designated as follows:

*Cumulative Percent Retained*

| Screen size (mesh) | #50 | #70 | #100 | #140 | #200 |
|---|---|---|---|---|---|
| Percent | 4 | 30 | 40 | 20 | 6 |

This sand was sieved and an 80–100 mesh cut placed in a two foot glass column packed by sifting the sand into the column about ⅓ full of water while vibrating the column. Permeability of this column was 12.3 darceys. This column was sterilized.

A culture of *Clostridium roseum* was used as the test organism. This is an anaerobic, spore-forming organism which produces acid and gas from various sugars. It is representative of the spore-forming anaerobes.

This organism was grown on a trypticase soy medium so that maximum cell production occurred. The culture after 48 hours changed to the spore form, which was isolated by standard techniques of centrifugation, followed by washing with mineral medium (no carbon source) to remove germination materials and cell debris. This resulted in clean spores free of vegetative cells. The spores were concentrated and held in the refrigerator until used. Their size was 0.7 micron ($\mu$) $\times 1\mu$, and are oval in shape.

At the same time, a culture was prepared of vegetative cells of the same organism but the culture was kept in the vegetative state. These cells occurred as rods $0.9\mu$ by $4\mu$, singly, in pairs, and in short chains. The vegetative cells in this medium produce a capsular material which binds the cells together in a more or less gummy mass.

Penetration of Cells Through Column

The sterilized sand pack was flooded with a suspension of the spores by passing 1000 cc. of mineral medium plus spores through the column. The presence of the spores in the effluent was detected by cultural tests (growth of the spores in a germination medium). It was found the spores did penetrate the column although some were retained.

| Flooding medium: | Effluent from column |
|---|---|
| Medium containing $1 \times 10^8$ spores/ml. | Medium containing $1 \times 10^6$ spores/ml. |

Thus, we find substantial penetration of the sand while some spores are retained in the column.

This column was then resterilized and the same procedure used to flood it with the vegetative cells. The presence of any cells were detected in the same manner.

| Flooding medium: | Effluent from column |
|---|---|
| Medium containing $1 \times 10^8$ vegetative cell/ml. | Medium containing 0 cells |

As can be seen the vegetative cells did not measurably penetrate the column, but were retained on the surface of the packed sand.

Method Used to Determine Oil Release

The same column was then sterilized and the water wetted sand flood with 100 cc. of Burbank field crude oil. This oil was then displaced by sterile mineral medium until no more oil would be released. The column was then flooded as before with the spore suspension. Once the spores began to appear in the effluent, a germination medium was used which caused the spores to germinate in the column and to release the oil. This germination medium consisted of 3 amino acids, L-alanine, L-arginine, and L-phenylalanine. Upon contact with the spores immediate germination and growth of the vegetative state occurs. The column was then flooded with more medium. It was found that additional oil was released, and from throughout the entire sand column, since gas formation and cell growth occurred throughout the column.

This experiment was repeated using germinating materials commonly available such as blackstrap molasses and soybean wastes. The same results occurred as with the amino acids alone. It appears any germinating material would function, such as dairy wastes, brewing wastes, etc.

This procedure was repeated, but the initial use of vegetative cells was substituted for spores. It was found that there was some oil release but it was only from the top of the packed sand column where the vegetative cells were concentrated and the oil was not released uniformly through the column.

The runs showed the following:

(1) Spores penetrate but vegetative cells do not.
(2) Spores are stable and can be injected, left, and will not start their action until activated by a germinating material.
(3) Oil release will occur throughout the system with spores, but only on the surface with the larger vegetative cells.
(4) Spores can penetrate smaller openings than the vegetative cells.
(5) Spores when germinated function as vegetative cells.
(6) It is not necessary to maintain spores in a metabolizing state as is so with vegetative cells, so spores would be easier to handle and store.

Various modifications and alterations of this invention will become apparent to those skilled in the art without departing from the scope and spirit of this invention and it should be understood that the latter is not necessarily limited to the above-mentioned discussion.

I claim:

1. In a method of treating hydrocarbons and bituminous materials encountered in combination with inorganic aggregate underground deposits for the purpose of facilitating separation and recovery of said materials, by contacting said materials in place with a substantial quantity of microorganisms selected from the spore formers in the group consisting of the genera Clostridium and Desulfovibrio in the presence of a substrate, and removing the resulting products, the improvement comprising inoculating a flooding medium with a substantial quantity of a spore form of bacteria, injecting a volume of said inoculated medium deep into the formation, following the said injected medium with a slug of a crude carbohydrate germinating material, and permitting the germinated spores to function as vegetative cells and release said materials from said underground deposits.

2. The method according to claim 1 wherein said germinating material is selected from the group of amino acids-containing crude carbohydrates consisting of blackstrap molasses, soybean wastes, and grain processing wastes.

3. The method according to claim 1 wherein said bacteria is *Clostridium roseum* and said germinating material is selected from the group of amino acids-containing crude carbohydrates consisting of blackstrap molasses, soybean wastes, and grain processing wastes.

4. The method according to claim 1 wherein said bacteria is *Clostridium roseum*, and said germinating material is blackstrap molasses.

5. A method of secondary recovery of hydrocarbons from subterranean petroleum deposits comprising inoculating a flooding medium with a substantial quantity of a bacteria in the spore form selected from the group consisting of the genera *Clostridium* and *Desulfovibrio*, injecting a volume of the resulting flooding medium deep into the subterranean formation, following the injected medium with a slug of a crude carbohydrate germinating material to contact and germinate said microorganisms in place, allowing sufficient time for the germinated spores to function as vegetative cells and release said hydrocarbons from said subterranean formation, and removing the resulting petroliferous products.

References Cited in the file of this patent

UNITED STATES PATENTS

| | | |
|---|---|---|
| 2,660,550 | Updegraff et al. | Nov. 24, 1953 |
| 2,807,570 | Updegraff | Sept. 24, 1957 |

OTHER REFERENCES

Bergey's Manual, 7th ed., The Williams & Wilkins Company, 1957, page 103.